United States Patent
Wu

(10) Patent No.: US 7,913,932 B2
(45) Date of Patent: Mar. 29, 2011

(54) SPRINKLER HAVING A MULTIFUNCTIONAL PROTECTIVE HOOD

(75) Inventor: Jui-Chang Wu, Sihu Township, Changhua County (TW)

(73) Assignee: SK&Y Agricultural Equipments Co., Ltd., Changhua County (TW)

( * ) Notice: Subject to any disclaimer, the term of this patent is extended or adjusted under 35 U.S.C. 154(b) by 30 days.

(21) Appl. No.: 12/494,543

(22) Filed: Jun. 30, 2009

(65) Prior Publication Data

US 2010/0327079 A1 Dec. 30, 2010

(51) Int. Cl.
  *B05B 1/28* (2006.01)
  *B05B 15/04* (2006.01)
  *B05B 9/04* (2006.01)
(52) U.S. Cl. ............... 239/288.5; 239/288; 239/373; 239/532; 239/600
(58) Field of Classification Search ....... 239/288–288.5, 239/302, 373, 525, 526, 532, 575, 590, 600, 239/DIG. 23
  See application file for complete search history.

(56) References Cited

U.S. PATENT DOCUMENTS 6,443,368 B1 * 9/2002 Kohls ............................ 239/288

* cited by examiner

*Primary Examiner* — Darren W Gorman
(74) *Attorney, Agent, or Firm* — Alan Kamrath; Kamrath & Associates PA

(57) ABSTRACT

A sprinkler includes a receiving barrel, a boosting unit, a spraying unit and a protective hood. The protective hood has a side provided with a plug which has an end face provided with a mounting post. The mounting post has an inner portion provided with a mounting recess and an end portion provided with a spraying hole. The end face of the plug has a periphery provided with a plurality of filtering holes. The plug of the protective hood is inserted into the mouth of the receiving barrel when the protective hood is mounted on the mouth of the receiving barrel. The mounting post of the protective hood is mounted on the nozzle head of the spraying unit when the protective hood is mounted on the nozzle head of the spraying unit.

15 Claims, 6 Drawing Sheets

SPRINKLER HAVING A MULTIFUNCTIONAL PROTECTIVE HOOD

BACKGROUND OF THE INVENTION

1. Field of the Invention

The present invention relates to a gardening tool and, more particularly, to a sprinkler that sprays sterilizing fluid outward.

2. Description of the Related Art

A conventional sprinkler 30 in accordance with the prior art shown in FIG. 6 comprises a receiving barrel 31, a boosting unit 32 and a spraying unit 33. The receiving barrel 31 has a top provided with a mouth 311. The mouth 311 of the receiving barrel 31 has an outer wall provided with a threaded locking portion 312. The boosting unit 32 is detachably mounted on the mouth 311 of the receiving barrel 31 and has an upper end provided with a threaded locking section 321 screwed into the locking portion 312 of the mouth 311. The spraying unit 33 has a first end connected with the receiving barrel 31 and a second end provided with a nozzle head 331. The nozzle head 331 of the spraying unit 33 is ratable relative to the spraying unit 33 to adjust the output modes (straight water beams or atomized water) of the nozzle head 331. In operation, a fluid, such as pesticide and the like, is filled through the mouth 311 into the receiving barrel 31. Then, the boosting unit 32 is mounted on the mouth 311 of the receiving barrel 31 to pressurize the fluid so that the fluid is compressed to pass through the spraying unit 33 and is injected outwardly from the nozzle head 331 of the spraying unit 33.

However, when the fluid directly contacts with the locking portion 312 of the mouth 311 during the filling process of the fluid, the undissolved powders contained in the fluid are attached to the locking portion 312 of the mouth 311 so that the locking section 321 of the boosting unit 32 is not combined with the locking portion 312 of the mouth 311 exactly and closely, thereby affecting operation of the boosting unit 22 and easily causing a leakage between the locking section 321 of the boosting unit 32 and the locking portion 312 of the mouth 311. In addition, the powders contained in the fluid easily blocks or chokes the boosting unit 32 or the nozzle head 331 of the spraying unit 33, thereby causing inconvenience in operation of the boosting unit 32 or the nozzle head 331 of the spraying unit 33. Further, the injected fluid from the nozzle head 331 of the spraying unit 33 easily flows backward to contact the user's body, thereby causing danger to the user. Further, the user needs to rotate the nozzle head 331 of the spraying unit 33 so as to adjust the output modes of the nozzle head 331 of the spraying unit 33 so that the user will directly touch the fluid that may be toxic, thereby causing danger to the user.

BRIEF SUMMARY OF THE INVENTION

In accordance with the present invention, there is provided a sprinkler, comprising a protective hood having a side provided with a protruding plug. The plug of the protective hood has an end face provided with a protruding mounting post. The mounting post of the protective hood has an inner portion provided with a mounting recess. The mounting post of the protective hood has an end portion provided with a spraying hole. The spraying hole of the mounting post is connected to the mounting recess. The end face of the plug has a periphery provided with a plurality of filtering holes. The protective hood has an inner portion provided with a chamber. The mounting post of the protective hood extends into the chamber.

The sprinkler further comprises a receiving barrel having a top provided with a mouth which has an outer wall provided with a threaded locking portion, a boosting unit detachably mounted on the mouth of the receiving barrel and locked by the locking portion of the mouth, and a spraying unit having a first end connected with the receiving barrel and a second end provided with a nozzle head. The protective hood is detachably mounted on the nozzle head of the spraying unit or detachably mounted on the mouth of the receiving barrel. The plug of the protective hood is detachably inserted into the mouth of the receiving barrel when the protective hood is mounted on the mouth of the receiving barrel. The mounting post of the protective hood is detachably mounted on the nozzle head of the spraying unit when the protective hood is mounted on the nozzle head of the spraying unit.

The primary objective of the present invention is to provide a sprinkler having a multifunctional protective hood.

Another objective of the present invention is to provide a sprinkler, wherein the protective hood can be mounted on the nozzle head of the spraying unit to protect the user and can be mounted on the mouth of the receiving barrel to protect the locking portion of the receiving barrel, the boosting unit and the nozzle head of the spraying unit.

A further objective of the present invention is to provide a sprinkler, wherein the protective hood separates the locking portion of the receiving barrel from the fluid during the filling process of the fluid to prevent undissolved powders contained in the fluid from being attached to the locking portion of the receiving barrel so that the boosting unit is combined with the locking portion of the receiving barrel exactly and closely so as to facilitate operation of the boosting unit.

A further objective of the present invention is to provide a sprinkler, wherein the protective hood is placed on the mouth of the receiving barrel so that the fluid can flow into the receiving barrel easily and quickly, thereby facilitating a user filling the fluid.

A further objective of the present invention is to provide a sprinkler, wherein the filtering holes of the protective hood can filter the powders contained in the fluid to prevent the boosting unit and the nozzle head of the spraying unit from being blocked or choked, thereby greatly facilitating operation of the boosting unit and the nozzle head of the spraying unit.

A further objective of the present invention is to provide a sprinkler, wherein the protective hood separates the user from the spraying hole of the mounting post to prevent the injected fluid from flowing backward to contact the user's body so as to protect the user during the spraying process of the fluid.

A further objective of the present invention is to provide a sprinkler, wherein the protective hood is locked onto the nozzle head of the spraying unit so that the nozzle head of the spraying unit can be rotated by the protective hood to adjust the output modes of the nozzle head, and the user needs not to rotate the nozzle head of the spraying unit so as to prevent the user directly touching the fluid.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a perspective view of a sprinkler in accordance with the preferred embodiment of the present invention.

FIG. 2 is a partially perspective cross-sectional view of a protective hood of the sprinkler as shown in FIG. 1.

FIG. 3 is a partially exploded perspective view of the sprinkler as shown in FIG. 1.

DETAILED DESCRIPTION OF THE INVENTION

Figure 1:
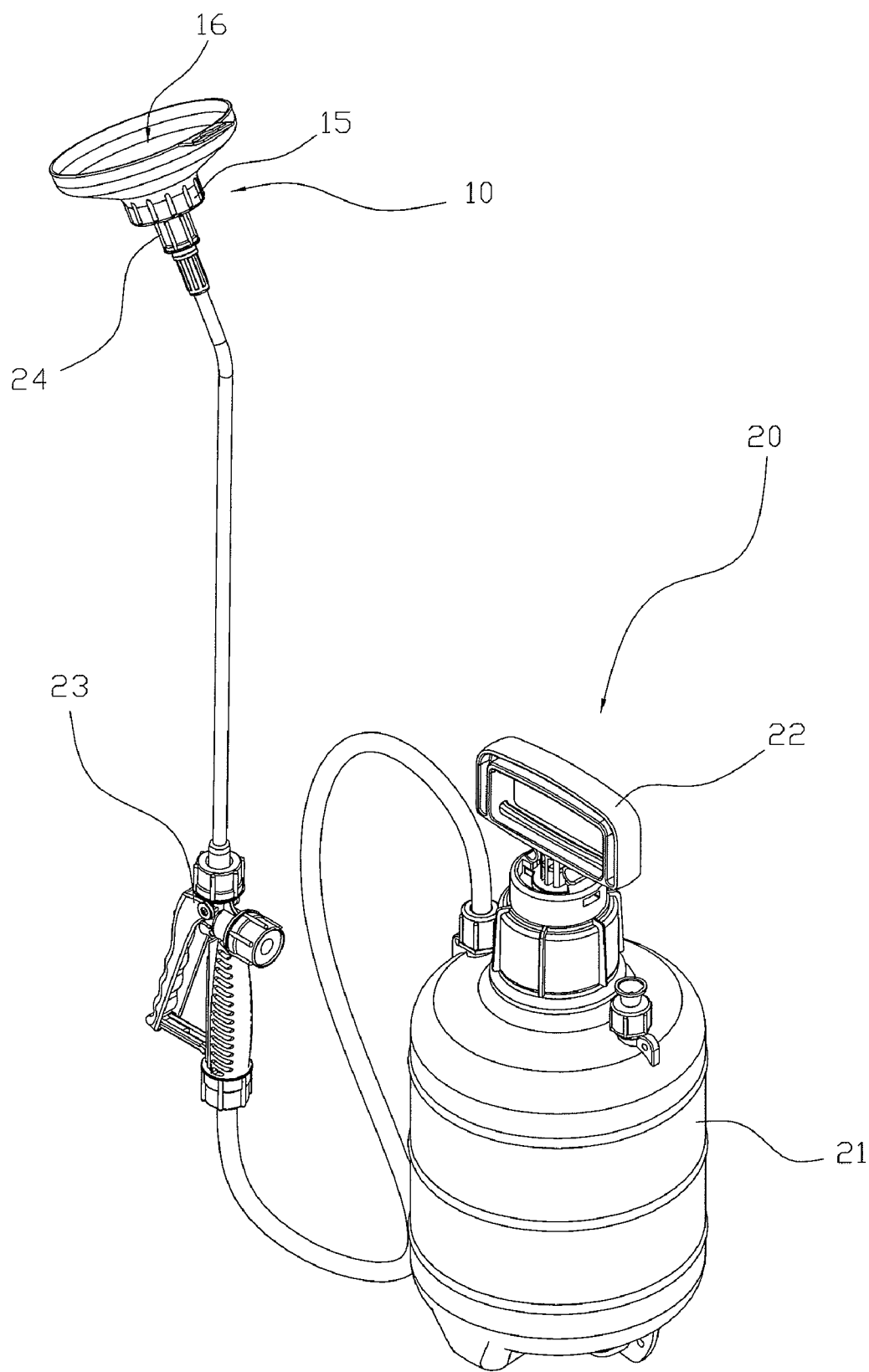
Figure 2:
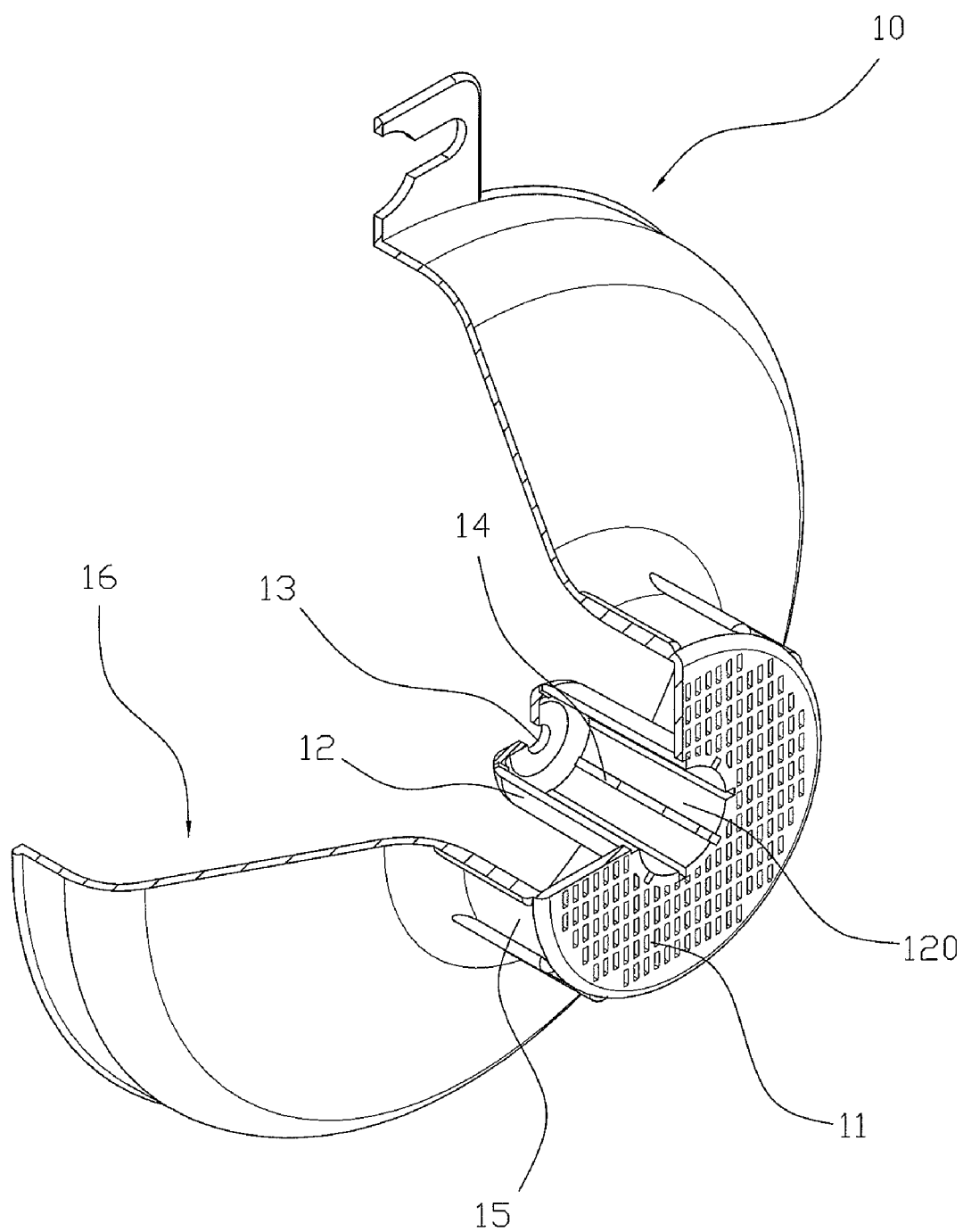

Referring to the drawings and initially to FIGS. 1-4, a sprinkler 20 in accordance with the preferred embodiment of the present invention comprises a receiving barrel 21, a boosting unit 22, a spraying unit 23 and a protective hood 10.

The receiving barrel 21 has a top provided with a mouth 211. The mouth 211 of the receiving barrel 21 has an outer wall provided with a threaded locking portion 212.

The boosting unit 22 is detachably mounted on the mouth 211 of the receiving barrel 21 and locked by the locking portion 212 of the mouth 211.

The spraying unit 23 has a first end connected with the receiving barrel 21 and a second end provided with a nozzle head 24. The nozzle head 24 of the spraying unit 23 is ratable relative to the spraying unit 23 to adjust the output modes (straight water beams or atomized water) of the nozzle head 24. The nozzle head 24 of the spraying unit 23 has a peripheral wall provided with a plurality of limit ribs 241. Each of the limit ribs 241 of the nozzle head 24 has an elongate shape and extends in a longitudinal direction of the nozzle head 24.

The protective hood 10 is detachably mounted on the nozzle head 24 of the spraying unit 23 or detachably mounted on the mouth 211 of the receiving barrel 21. The protective hood 10 has a size greater than that of the nozzle head 24 of the spraying unit 23 and that of the mouth 211 of the receiving barrel 21.

The protective hood 10 has a funnel shape and has an inner portion provided with a chamber 16. The chamber 16 of the protective hood 10 has a tapered shape. The protective hood 10 has a side provided with a protruding plug 15 that is detachably inserted into the mouth 211 of the receiving barrel 21. The plug 15 of the protective hood 10 is a hollow body and has an end face provided with a protruding mounting post 12 detachably mounted on the nozzle head 24 of the spraying unit 23.

The mounting post 12 of the protective hood 10 is located at a central portion of the plug 15 and has an inner portion provided with a mounting recess 120 detachably mounted on the nozzle head 24 of the spraying unit 23. The mounting post 12 of the protective hood 10 extends into the chamber 16 and has an end portion provided with a spraying hole 13 connected between the chamber 16 and the nozzle head 24 of the spraying unit 23. The spraying hole 13 of the mounting post 12 is located at a central portion of the mounting post 12 and is connected to the mounting recess 120. The mounting post 12 of the protective hood 10 has a peripheral wall provided with a plurality of limit slots 14 detachably locked onto the limit ribs 241 of the nozzle head 24 so that the protective hood 10 is detachably locked onto the nozzle head 24 of the spraying unit 23, and the nozzle head 24 of the spraying unit 23 is rotatable in concert with the protective hood 10. Each of the limit slots 14 of the mounting post 12 has an elongate shape and extends in a longitudinal direction of the mounting post 12. The end face of the plug 15 has a periphery provided with a plurality of filtering holes 11 each connected between the chamber 16 and the mouth 211 of the receiving barrel 21.

Figure 3:
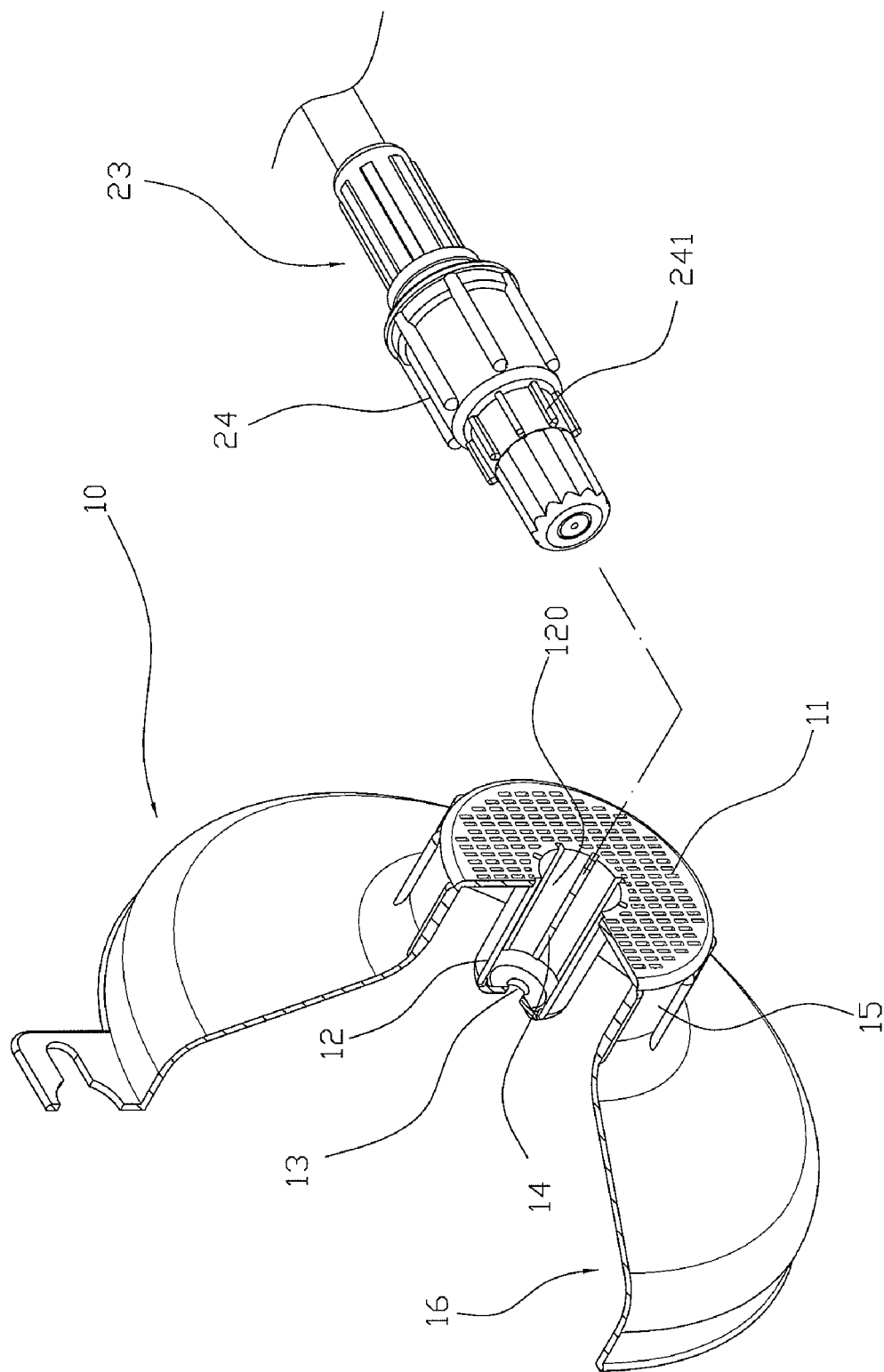
Figure 4:
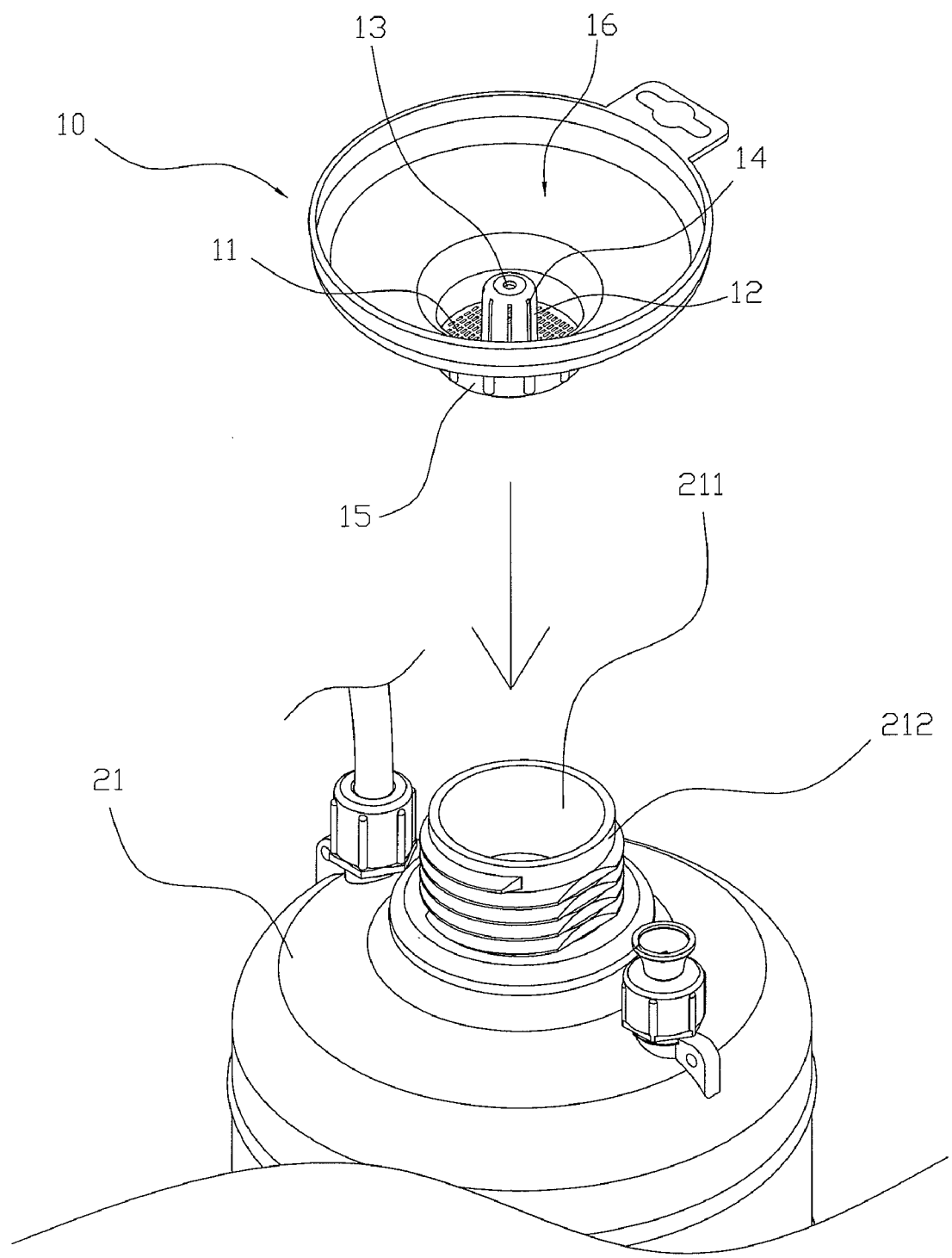
FIG. 4 is a partially exploded perspective view of the sprinkler as shown in FIG. 1.
Figure 5:
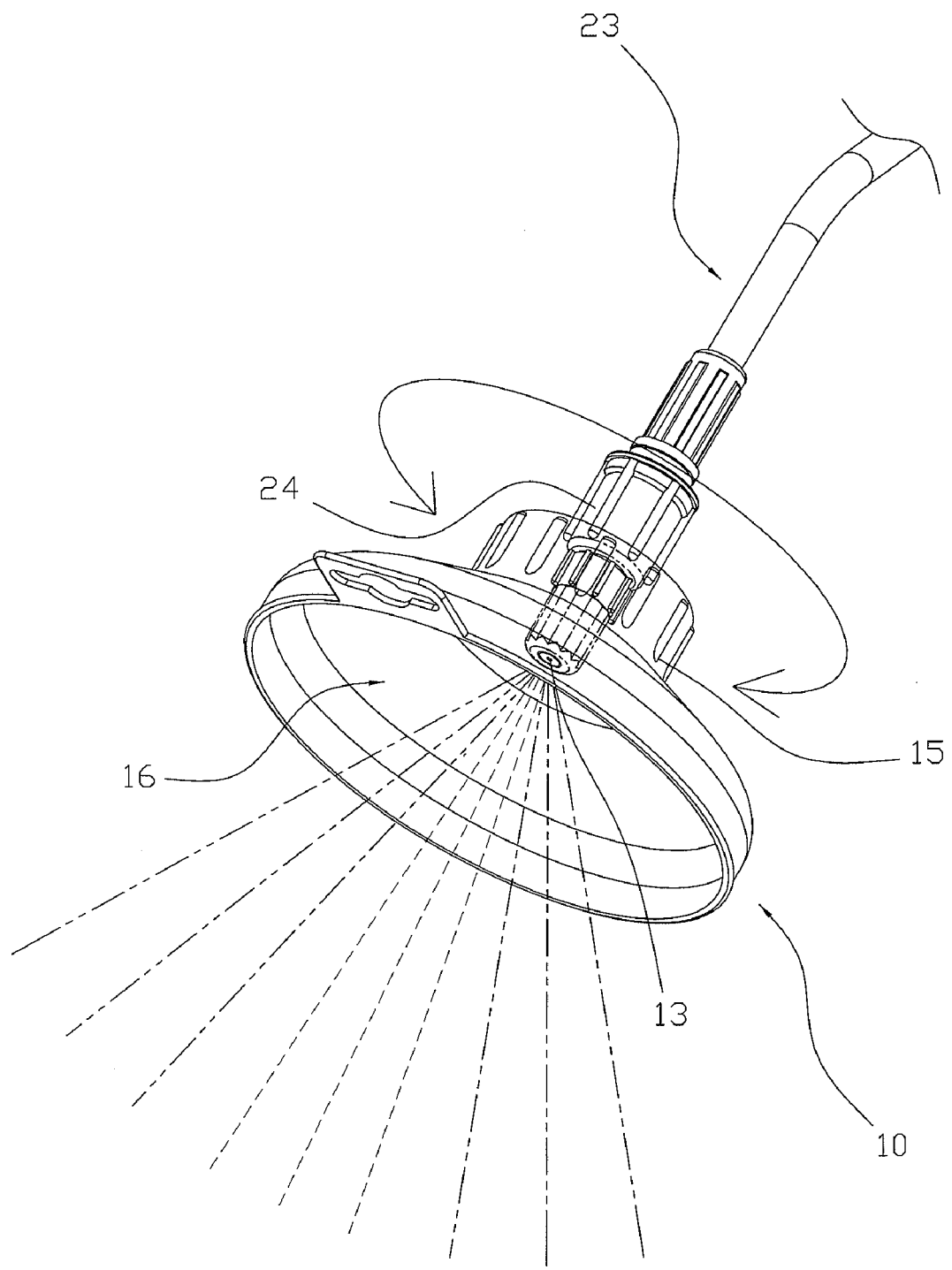
FIG. 5 is a schematic operational view of the sprinkler as shown in FIG. 1 in use.
Figure 6:
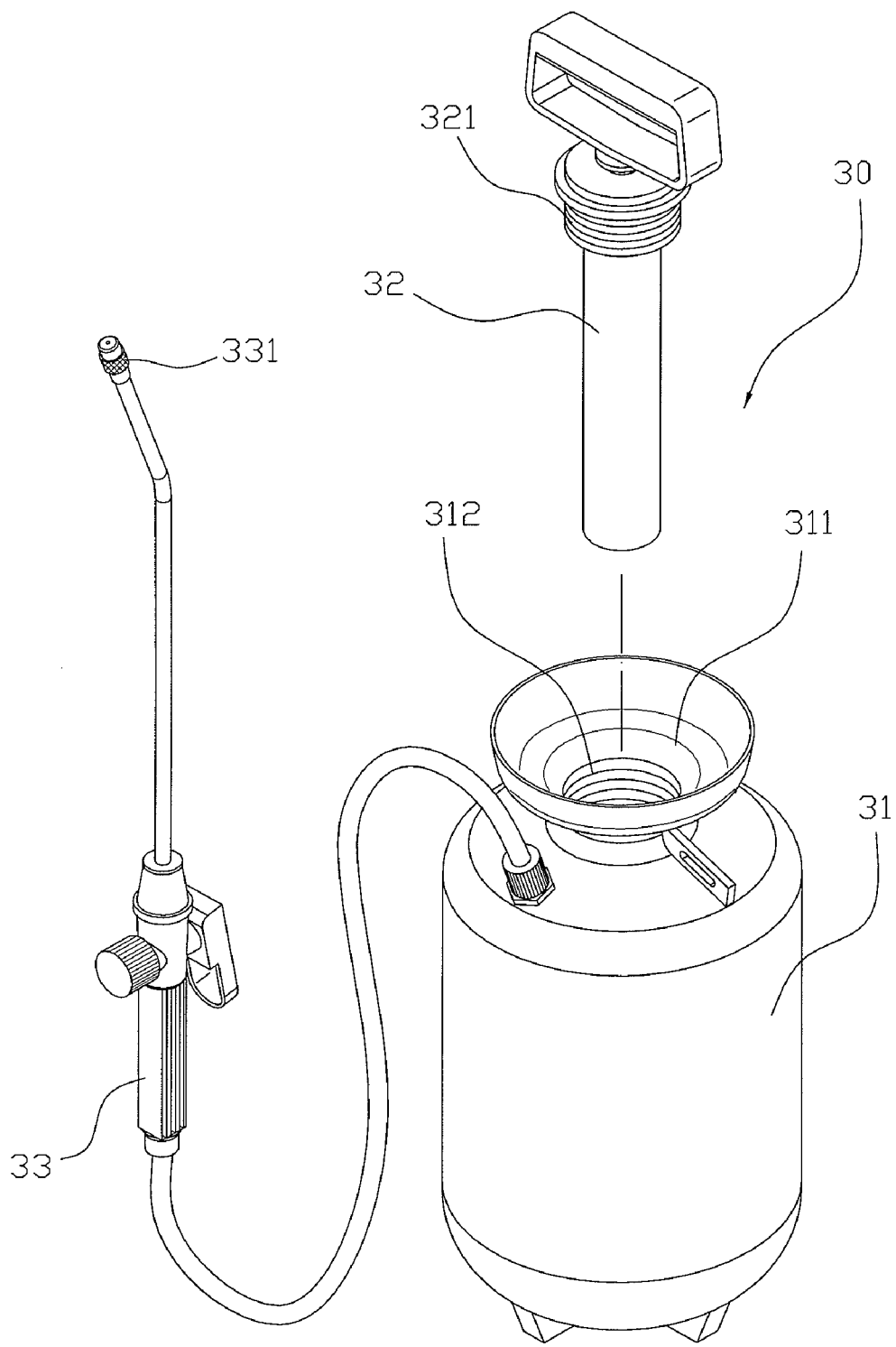
FIG. 6 is a partially exploded perspective view of a conventional sprinkler in accordance with the prior art.

In operation, referring to FIG. 5 with reference to FIGS. 1-4, a fluid, such as pesticide and the like, is filled through the mouth 211 into the receiving barrel 21. Then, the boosting unit 22 is mounted on the mouth 211 of the receiving barrel 21 and locked by the locking portion 212 of the mouth 211 to pressurize the fluid so that the fluid is compressed to pass through the spraying unit 23 and is injected outwardly from the nozzle head 24 of the spraying unit 23.

In practice, when the protective hood 10 is mounted on the mouth 211 of the receiving barrel 21, the plug 15 of the protective hood 10 is inserted into the mouth 211 of the receiving barrel 21 as shown in FIG. 4 to attach the protective hood 10 to the mouth 211 of the receiving barrel 21 so that the protective hood 10 is placed on the mouth 211 of the receiving barrel 21. In such a manner, the fluid will flow through the chamber 16 and the filtering holes 11 of the protective hood 10 and through the mouth 211 of the receiving barrel 21 and is filled into the receiving barrel 21. At this time, the protective hood 10 separates the locking portion 212 of the receiving barrel 21 from the fluid during the filling process of the fluid to prevent undissolved powders contained in the fluid from being attached to the locking portion 212 of the receiving barrel 21 so that the boosting unit 22 is combined with the locking portion 212 of the receiving barrel 21 exactly and closely so as to facilitate operation of the boosting unit 22. In addition, the protective hood 10 is placed on the mouth 211 of the receiving barrel 21 so that the fluid can flow into the receiving barrel 21 easily and quickly, thereby facilitating a user filling the fluid. Further, the filtering holes 11 of the protective hood 10 can filter the powders contained in the fluid to prevent the boosting unit 22 and the nozzle head 24 of the spraying unit 23 from being blocked or choked, thereby greatly facilitating operation of the boosting unit 22 and the nozzle head 24 of the spraying unit 23.

Alternatively, when the protective hood 10 is mounted on the nozzle head 24 of the spraying unit 23, the mounting post 12 of the protective hood 10 is mounted on the nozzle head 24 of the spraying unit 23 as shown in FIG. 3 to attach the protective hood 10 to the nozzle head 24 of the spraying unit 23. In such a manner, the fluid from the nozzle head 24 of the spraying unit 23 will flow through and is injected outwardly from the spraying hole 13 of the mounting post 12. At this time, the protective hood 10 separates the user from the spraying hole 13 of the mounting post 12 to prevent the injected fluid from flowing backward to contact the user's body so as to protect the user during the spraying process of the fluid. In addition, the protective hood 10 is locked onto the nozzle head 24 of the spraying unit 23 so that the nozzle head 24 of the spraying unit 23 can be rotated by the protective hood 10 to adjust the output modes of the nozzle head 24, and the user needs not to rotate the nozzle head 24 of the spraying unit 23 so as to prevent the user directly touching the fluid.

Accordingly, the protective hood 10 can be mounted on the nozzle head 24 of the spraying unit 23 to protect the user and can be mounted on the mouth 211 of the receiving barrel 21 to protect the locking portion 212 of the receiving barrel 21, the boosting unit 22 and the nozzle head 24 of the spraying unit 23. In addition, the protective hood 10 separates the locking portion 212 of the receiving barrel 21 from the fluid during the filling process of the fluid to prevent undissolved powders contained in the fluid from being attached to the locking portion 212 of the receiving barrel 21 so that the boosting unit 22 is combined with the locking portion 212 of the receiving barrel 21 exactly and closely so as to facilitate operation of the boosting unit 22. Further, the protective hood 10 is placed on the mouth 211 of the receiving barrel 21 so that the fluid can flow into the receiving barrel 21 easily and quickly, thereby facilitating a user filling the fluid. Further, the filtering holes 11 of the protective hood 10 can filter the powders contained in the fluid to prevent the boosting unit 22 and the nozzle head 24 of the spraying unit 23 from being blocked or choked, thereby greatly facilitating operation of the boosting unit 22 and the nozzle head 24 of the spraying unit 23. Further, the protective hood 10 separates the user from the spraying hole 13 of the mounting post 12 to prevent the injected fluid from flowing backward to contact the user's body so as to protect the user during the spraying process of the fluid. Further, the protective hood 10 is locked onto the nozzle head 24 of the spraying unit 23 so that the nozzle head 24 of the spraying unit 23 can be rotated by the protective hood 10 to adjust the output modes of the nozzle head 24, and the user needs not to rotate the nozzle head 24 of the spraying unit 23 so as to prevent the user directly touching the fluid.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sprinkler, comprising:
   a protective hood having a side provided with a protruding plug;
   wherein the plug of the protective hood has an end face provided with a protruding mounting post;
   the mounting post of the protective hood has an inner portion provided with a mounting recess;
   the mounting post of the protective hood has an end portion provided with a spraying hole;
   the spraying hole of the mounting post is connected to the mounting recess;
   the end face of the plug has a periphery provided with a plurality of filtering holes;
   the protective hood has an inner portion provided with a chamber;
   the mounting post of the protective hood extends into the chamber;
   the sprinkler further comprises:
   a receiving barrel having a top provided with a mouth which has an outer wall provided with a threaded locking portion;
   a boosting unit detachably mounted on the mouth of the receiving barrel and locked by the locking portion of the mouth;
   a spraying unit having a first end connected with the receiving barrel and a second end provided with a nozzle head;
   the protective hood is capable of being detachably mounted on the nozzle head of the spraying unit; and
   the protective hood is capable of being detachably mounted on the mouth of the receiving barrel.

2. The sprinkler of claim 1, wherein the protective hood has a funnel shape.

3. The sprinkler of claim 1, wherein the chamber of the protective hood has a tapered shape.

4. The sprinkler of claim 1, wherein the spraying hole of the mounting post is connected between the chamber and the nozzle head of the spraying unit when the protective hood is mounted on the nozzle head of the spraying unit.

5. The sprinkler of claim 1, wherein
   the nozzle head of the spraying unit has a peripheral wall provided with a plurality of limit ribs; and
   the mounting post of the protective hood has a peripheral wall provided with a plurality of limit slots detachably locked onto the limit ribs of the nozzle head when the protective hood is mounted on the nozzle head of the spraying unit.

6. The sprinkler of claim 5, wherein
   each of the limit ribs of the nozzle head has an elongate shape; and
   each of the limit slots of the mounting post has an elongate shape.

7. The sprinkler of claim 5, wherein
   each of the limit ribs of the nozzle head extends in a longitudinal direction of the nozzle head; and
   each of the limit slots of the mounting post has extends in a longitudinal direction of the mounting post.

8. The sprinkler of claim 1, wherein each of the filtering holes of the protective hood is connected between the chamber and the mouth of the receiving barrel when the protective hood is mounted on the mouth of the receiving barrel.

9. The sprinkler of claim 1, wherein the plug of the protective hood is detachably inserted into the mouth of the receiving barrel when the protective hood is mounted on the mouth of the receiving barrel.

10. The sprinkler of claim 1, wherein the mounting post of the protective hood is detachably mounted on the nozzle head of the spraying unit when the protective hood is mounted on the nozzle head of the spraying unit.

11. The sprinkler of claim 10, wherein the mounting recess of the mounting post is detachably mounted on the nozzle head of the spraying unit.

12. The sprinkler of claim 1, wherein the protective hood has a size greater than that of the nozzle head of the spraying unit and that of the mouth of the receiving barrel.

13. The sprinkler of claim 1, wherein the plug of the protective hood is a hollow body.

14. The sprinkler of claim 13, wherein the mounting post of the protective hood is located at a central portion of the plug.

15. The sprinkler of claim 1, wherein the spraying hole of the mounting post is located at a central portion of the mounting post.

\* \* \* \* \*